US010839324B2

(12) United States Patent
Dow et al.

(10) Patent No.: US 10,839,324 B2
(45) Date of Patent: *Nov. 17, 2020

(54) TASK HANDLING IN A MASTER DATA MANAGEMENT SYSTEM

(71) Applicant: INTERNATIONAL BUSINESS MACHINES CORPORATION, Armonk, NY (US)

(72) Inventors: Barry N. Dow, Hampshire (GB); Jonathan Limburn, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 271 days.

This patent is subject to a terminal disclaimer.

(21) Appl. No.: 15/618,441

(22) Filed: Jun. 9, 2017

(65) Prior Publication Data
US 2017/0278043 A1 Sep. 28, 2017

Related U.S. Application Data

(63) Continuation of application No. 15/075,236, filed on Mar. 21, 2016.

(51) Int. Cl.
G06Q 10/06 (2012.01)
G06N 5/02 (2006.01)

(52) U.S. Cl.
CPC ..... *G06Q 10/063114* (2013.01); *G06N 5/025* (2013.01); *G06Q 10/06316* (2013.01); *G06Q 10/06395* (2013.01)

(58) Field of Classification Search
CPC .. G06Q 10/06; G06Q 10/0633; G06Q 10/103; G06Q 10/0631; G06Q 10/10;
(Continued)

(56) References Cited

U.S. PATENT DOCUMENTS 8,200,527 B1 6/2012 Thompson et al.
8,412,735 B2 4/2013 Yeh et al.
(Continued)

OTHER PUBLICATIONS

Q. Cao, Z. Wei and W. Gong, "An Optimized Algorithm for Task Scheduling Based on Activity Based Costing in Cloud Computing," 2009 3rd International Conference on Bioinformatics and Biomedical Engineering, Beijing, 2009, pp. 1-3. (Year: 2009).*
(Continued)

Primary Examiner — Jamie H Austin
(74) Attorney, Agent, or Firm — Kenneth Han

(57) ABSTRACT

Task handling in a master data management (MDM) system. A task pattern associated with a task completed is identified, in a task handling system. If the identified task pattern matches an existing task pattern in a task patterns database, then a pattern count value of the matching existing task pattern is incremented, and the task patterns database is searched for task patterns that are similar to the matching existing task pattern. If similar task patterns are identified, for each of the similar task patterns, a duplicate pattern count is specified that is based on the number of identified similar task patterns. If the duplicate pattern count for any one of the similar task patterns exceeds a specified threshold, a new task is created comprising data on completion actions for the matching existing task pattern and each of the one or more similar task patterns.

7 Claims, 11 Drawing Sheets

(58) Field of Classification Search
CPC ............. G06Q 10/06311; G06Q 30/02; G06Q 30/0201; G06Q 10/063112; G06Q 30/0204; G06Q 10/06398; G06Q 10/063; G06Q 10/06316; G06Q 10/00; G06Q 30/0214; G06Q 50/18; G06Q 10/06313; G06Q 30/04; G06Q 40/12; G06Q 50/01; G06Q 50/06; G06Q 50/22; G06Q 50/32; G06Q 10/06312; G06Q 10/0637; G06Q 10/06393; G06Q 10/067; G06Q 10/109; G06Q 10/20; G06Q 20/145; G06Q 20/29; G06Q 2230/00; G06Q 30/016; G06Q 30/0241; G06Q 30/0261; G06Q 30/0264; G06Q 30/0279; G06Q 30/0283; G06Q 30/0601; G06Q 30/08; G06Q 40/08; G06Q 50/184; G06Q 50/20; G06Q 10/06395; G06Q 10/063114; G06N 5/025
USPC ........................................ 705/7.11, 7.15, 7.26
See application file for complete search history.

(56) References Cited

U.S. PATENT DOCUMENTS

| | | | |
|---|---|---|---|
| 8,601,029 B2 | 12/2013 | Anand et al. | |
| 8,661,065 B2 | 2/2014 | Rausch et al. | |
| 8,700,577 B2 | 4/2014 | Yeh et al. | |
| 2003/0028409 A1* | 2/2003 | Flores .................... | G06Q 10/10 717/135 |
| 2009/0281865 A1* | 11/2009 | Stoitsev ........... | G06Q 10/06312 705/7.22 |
| 2011/0126206 A1 | 5/2011 | Kato et al. | |
| 2012/0017262 A1* | 1/2012 | Kapoor ............... | H04L 63/1408 726/1 |
| 2012/0215733 A1 | 8/2012 | Breiter et al. | |
| 2013/0054646 A1* | 2/2013 | Zizka .................... | G06Q 10/06 707/780 |
| 2013/0067182 A1 | 3/2013 | Westbrooke | |
| 2014/0052695 A1 | 2/2014 | Cohen et al. | |
| 2014/0279947 A1 | 9/2014 | Chachra et al. | |
| 2014/0379417 A1 | 12/2014 | Gujjewar et al. | |
| 2015/0006491 A1 | 1/2015 | He et al. | |
| 2015/0058280 A1 | 2/2015 | Nelke et al. | |
| 2015/0193511 A1 | 7/2015 | Woody et al. | |
| 2017/0075724 A1 | 3/2017 | Bentley et al. | |
| 2017/0075725 A1 | 3/2017 | Bentley et al. | |
| 2018/0011739 A1* | 1/2018 | Pothula .................... | G06F 9/50 |

OTHER PUBLICATIONS

IBM: List of IBM Patents or Patent Applications Treated as Related (Appendix P), May 2, 2018, pp. 1-2.

Nassreddine et al., "Cognitive governance, cognitive mapping and cognitive conflicts: Structural analysis with the MICMAC method", Nassreddine & Anis, Cogent Economics & Finance (2014), pp. 1-13. http://dx.doi.org/10.1080/23322039.2014.922893.

Otto B., "How to design the master data architecture: Findings from a case study at Bosch", International Journal of Information Management, vol. 32, Issue 4, Aug. 2012, pp. 337-346. © 2011 Elsevier Ltd. DOI:10.1016/j.ijinfomgt.2011.11.018.

Woodall et al., "A Classification of Data Quality Assessment and Improvement Methods", https://www.repository.cam.ac.uk/handle/1810/24720, Date: 2014, 3 pages.

Leonard et al., "Data Correction with Data Quality Services", http://www.link.springer.com/chapter/10.1007%2F978-1-4842-0082-7_5, Date: Dec. 19, 2014, Chapter 5, pp. 101-123.

Dow et al., "Task Handling in a Master Data Management System", U.S. Appl. No. 15/075,236, filed Mar. 21, 2016.

Bentley et al., "Task Handling in a Multisystem Environment", U.S. Appl. No. 15/334,320, filed Oct. 26, 2016.

* cited by examiner

610a Task ID: 001 ← 615
Task Type: Suspect Duplicate ← 620
Record A ID: 12345
Record B ID: 67890 ← 625
Source ID: HOS ← 630
Linked Attributes: PostCode, AddressLine1 ← 635
Action Taken: Collapse A into B ← 640

610b Task ID: 002
Task Type: Suspect Duplicate
Record A ID: 00032
Record B ID: 32234
Source ID: POL
Linked Attributes: FirstName, SSN, AddressLine1
Action Taken: Ignore 610c Task ID: 003
Task Type: Suspect Duplicate
Record A ID: 43424
Record B ID: 42333
Source ID: HOL
Linked Attributes: ContactMethod, FirstName
Action Taken: Collapse B into A 610d Task ID: 004
Task Type: Suspect Duplicate
Record A ID: 11098
Record B ID: 00987
Source ID: HOL
Linked Attributes: PostCode, AddressLine1
Action Taken: Collapse A into B 610x Task ID: 005 ← 615a
Task Type: DuplicateCountThresholdAlert ← 620a
Possible Action 1: Collapse A into B ← 625a
Possible Action 2: Collapse B into A ← 625b
Action Taken: Collapse A into B ← 640a

Figure 6

TASK HANDLING IN A MASTER DATA MANAGEMENT SYSTEM

FIELD OF THE INVENTION

The present invention relates generally to the field of task handling in a task handling system, and more particularly task handling in a master data management (MDM) system.

An organization, such as a commercial company, can generate a large amount of data during an organization's typical operations. Maintaining the quality and accuracy of the generated data is important, because the data is essential for the organization's operations. For example, data generated by a commercial company may include: data about customers, suppliers, partners, products, materials, accounts, and employees and their records. Such data is termed as master data which is of high value to the particular company because it's needed across different business processes, across organizational units, and between operational systems and decision support systems of the particular company. Typically, if more than one system is implemented, then data records in master data can be in different data formats and data structures.

An MDM system can be implemented to handle different data formats and data structures, enabling coherent and consistent handling of an organization's master data. An MDM system can be a computing system comprising a set of data governance processes, tools, policies, and rules, which provide coherent and consistent data handling.

One feature of an MDM system is that the MDM system can apply rules and policies to data records for unifying an organization's view of their master data. This application may involve maintaining a central authoritative repository of the organization's master data. The rules and policies can be manually defined, for example by a data governance council of individuals understanding an organization's master data requirements. An understanding of an organization's master data requirements may involve understanding: the usage of the data, the source of the data and its data structure, industry specific compliance and regulation requirements, and corporate best practices for data, and the like.

In a typical MDM system, processing data can generate tasks. Generated tasks can comprise identifying actions which can be applied to data to modify the data. For example, identifying actions can be applied to data to correct inaccuracies, inconsistencies and duplications. Many tasks may be handled by the MDM system, such that the MDM system applies rules to the data and updates the data as required by the rules without further intervention. Some tasks do not match specific rules exactly but are, for example, partial matches. These tasks that partially match specific rules require a handling by an operator, known as a data steward.

The data steward can be an individual, for example an individual authorized by the data governance council of the organization, that supervises the quality of the organization's master data. The data steward must apply their judgment and understanding of rules and policies to the partially matched data, and decide on an appropriate action to apply to the data.

An organization may have a significant number of tasks (e.g., thousands of tasks) that require manual intervention, such that the number of tasks can be created on a daily basis as modifications to master data are made.

SUMMARY

Embodiments of the present invention provide systems, methods, and computer program products for task handling in a master data management system. A task pattern associated with a task completed is identified, in a task handling system, wherein the identified task pattern includes: at least one of task data and task metadata; and an action taken in the task handling system to complete a task. Responsive to determining that the identified task pattern matches an existing task pattern in a task patterns database, a pattern count value of the matching existing task pattern is incremented, and the task patterns database is searched for task patterns that are similar to the matching existing task pattern. Responsive to determining that one or more similar task patterns are identified, for each of the one or more similar task patterns, a duplicate pattern count is specified that is based on the number of identified similar task patterns. Responsive to determining that the duplicate pattern count for any one of the one or more similar task patterns exceeds a specified threshold, a new task is created comprising data on completion actions for the matching existing task pattern and each of the one or more similar task patterns.

BRIEF DESCRIPTION OF THE DRAWINGS

FIG. 6 is a block diagram illustrating an active task list including task queue, in accordance with an embodiment of the present invention;

DETAILED DESCRIPTION

Embodiments of the invention will be described with reference to a task handling system for handling tasks which arise in relation to an MDM system. It will be apparent to a person skilled in the art that embodiments of the invention may find application in other task handling systems which are concerned with the maintenance of the quality of the data used by an organization.

Figure 1:
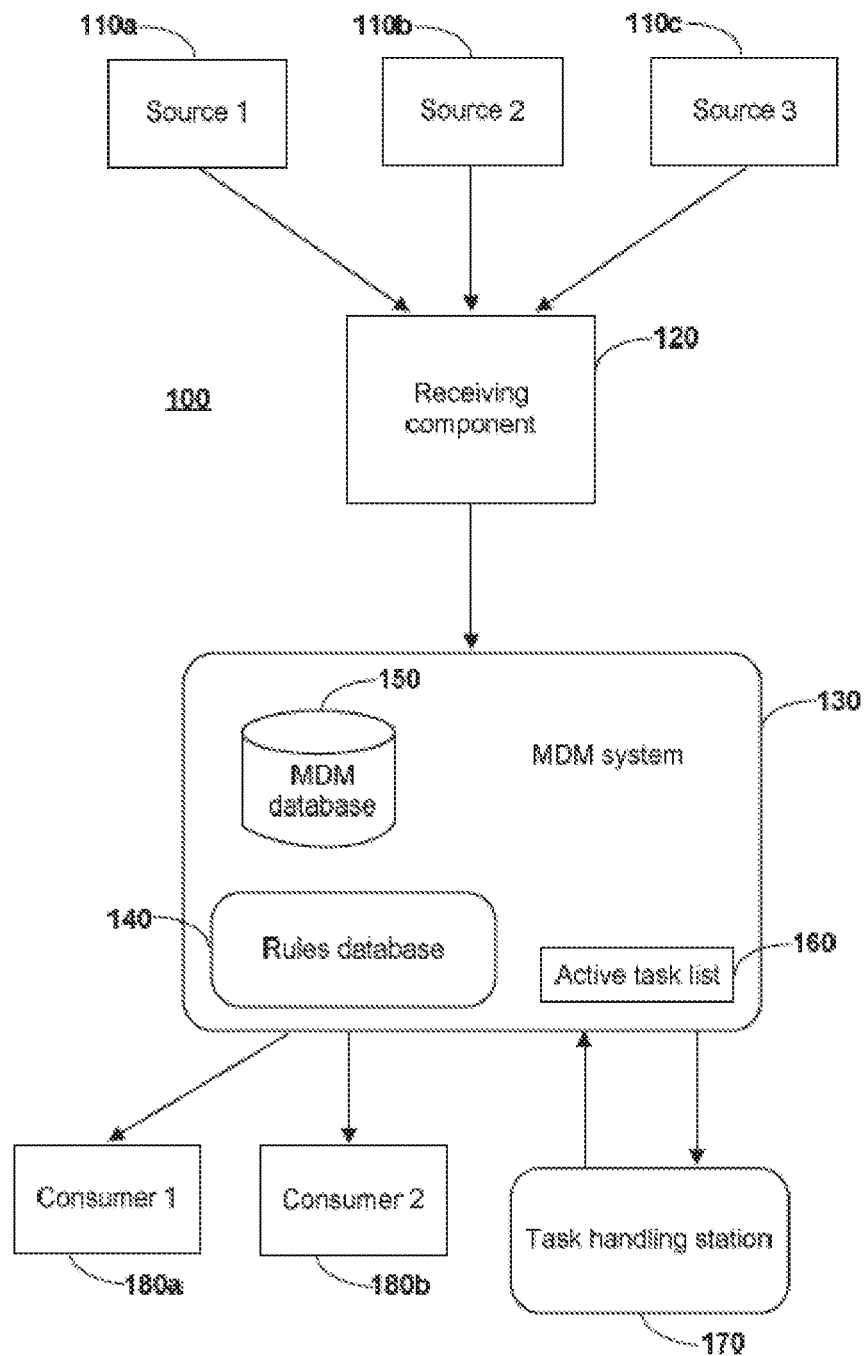
FIG. 1 is a block diagram illustrating an organizational data processing system, in accordance with an embodiment of the present invention.

FIG. 1 illustrates organizational data processing system 100, in accordance with an embodiment of the present invention. In this embodiment, organizational data processing system 100 includes MDM system 130. A person skilled in the art will understand that there can be a number of possible structures for organizing MDM system 130. For example, a database of master data may be maintained as a separate entity in MDM system 130. Alternatively MDM system 130 may provide a view in to a collection of source system databases, or the system may be a hybrid comprising some combination of the two. FIG. 1 will be described with reference to a system in which a separate database of master data is maintained by MDM system 130.

FIG. 1 is a block diagram illustrating an organizational data processing structure comprising three example organization source systems. It will be apparent that this is by way of example and that any number of source systems 1-3 110a-c may be implemented. Source system 1 110a, source system 2 110b, and source system 3 110c, may represent different areas of an organization's functioning. For example, each of source systems 1-3 110a-c can be a sales system, a customer database system, and a payroll system. Source systems 1-3 110a-c continually generate new data. For example, source system 1 110a, may be a sales system which generates data relating to a sale. In addition to data being handled within source system 1 110a, the data relating to the sale can be transmitted to receiving component 120 for subsequent operations performed by MDM system 130.

Receiving component 120 receives data from each of source systems 1-3 110a-c, and performs an analysis to identify data which may be relevant to the organization's master data collection. For example, receiving component 120 may comprise an application program, a constituent component of a larger data processing system, or a component of MDM system 130. Receiving component 120 may further process received data. For example, receiving component 120 may map the received data to a format compatible with the data format of MDM system 130. In this embodiment, receiving component 120 transmits processed data to MDM system 130.

MDM system 130 comprises rules database 140 including a collection of policies and rules which have been determined to be appropriate for application to the organization's master data. Such policies and rules describe the types of data to be recorded as master data, the form of the data, and the actions to be performed upon the data. The policies and rules may be set (e.g., defined) based on a data governance strategy proposed by a data governance council of individuals who understand the organization's master data requirements.

MDM system 130 also comprises MDM database 150 including master data. MDM system 130 compares received data with master data in MDM database 150, and applies appropriate rules specified in rules database 140. With the application of appropriate rules of rules database 140, MDM system 130 identifies a task relevant to the received data. For example, the task can include one or more items of data and an action which could be applied to the one or more items of data. With the application of further rules from rules database 140, MDM system 130 determines whether the identified task matches a rule to a sufficient degree of similarity, whereby enabling the identified task to be automatically processed by MDM system 130.

For example, the data may comprise a name and address and the task may comprise identifying a duplicate name and address record in the master data. A rule may specify the criteria of similarity which determines whether the identified task matches a rule to a sufficient degree of similarity. For example, small differences in certain fields may be allowed whilst identifying two records as relating to the same entity. If the similarity criteria is met, MDM system 130 can automatically confirm the match and associate the new data in MDM system 130 with the master data record of MDM database 150. For example, MDM system 130 can confirm the match and associate the new data by updating an address record in the master data.

If an identified task does not completely satisfy a similarity criteria of a rule, but instead partially satisfies the similarity criteria of the rule, then the identified task may be a partial match, and MDM system 130 does not automatically process the task. An identified task that is determined to be a partial match requires further action. For example, an address may match parts of an address in a master data record but not sufficiently to satisfy the criteria of an address matching rule for automatically collapsing the two in to one, that is identifying the two as the same address, and so the addresses are categorized as suspected duplicates. The further action may comprise transmitting the identified task to task handling station 170, via task handling functionality of MDM system 130. Task handling station 170 is a workstation for an administrative operator, such as a data steward. As previously described, a data steward can be an individual authorized by the data governance council of the organization that supervises the quality of an organization's master data. Although illustrated as a single task handling station 170, it will be apparent that any number of task handling stations 170 and data stewards may be implemented, based on a volume of tasks which require further action.

Task handling functionality of MDM system 130 sends tasks as they are generated by MDM system 130 to active task list 160. Active task list 160 includes a queue for further actions to be performed by task handling station 170 of a data steward. Although illustrated as a single active task list 160 and queue, active task list 160 may comprise any number of individual queues (e.g., one queue per task handling station 170 of a data steward). Data steward operating task handling station 170 may determine an appropriate action for each queued task based on the data steward's understanding of the policies and rules of the data governance council. In the previously described example regarding addresses identified as suspected duplicates, a determination of an appropriate action may involve determining whether the suspected duplicates represent the same address. Task handling station 170 passes the determined action for the queued task to MDM system 130 which applies the determined action to the appropriate master data in MDM database 150.

Organizational data processing system 100 also includes master data consuming systems of an organization, such as consumer 1 180a and consumer 2 180b. Consumers 1 180a and 2 180b are systems of the organization which require access to the data records of the organization's master data. It will be apparent that any number of consumer 1 180a and consumer 2 180b may receive master data from MDM database 150 of MDM system 130. It will be apparent also that each of consumer 1 180a and consumer 2 180b may comprise the same system as one of source systems 1-3 110a-c.

Figure 2:
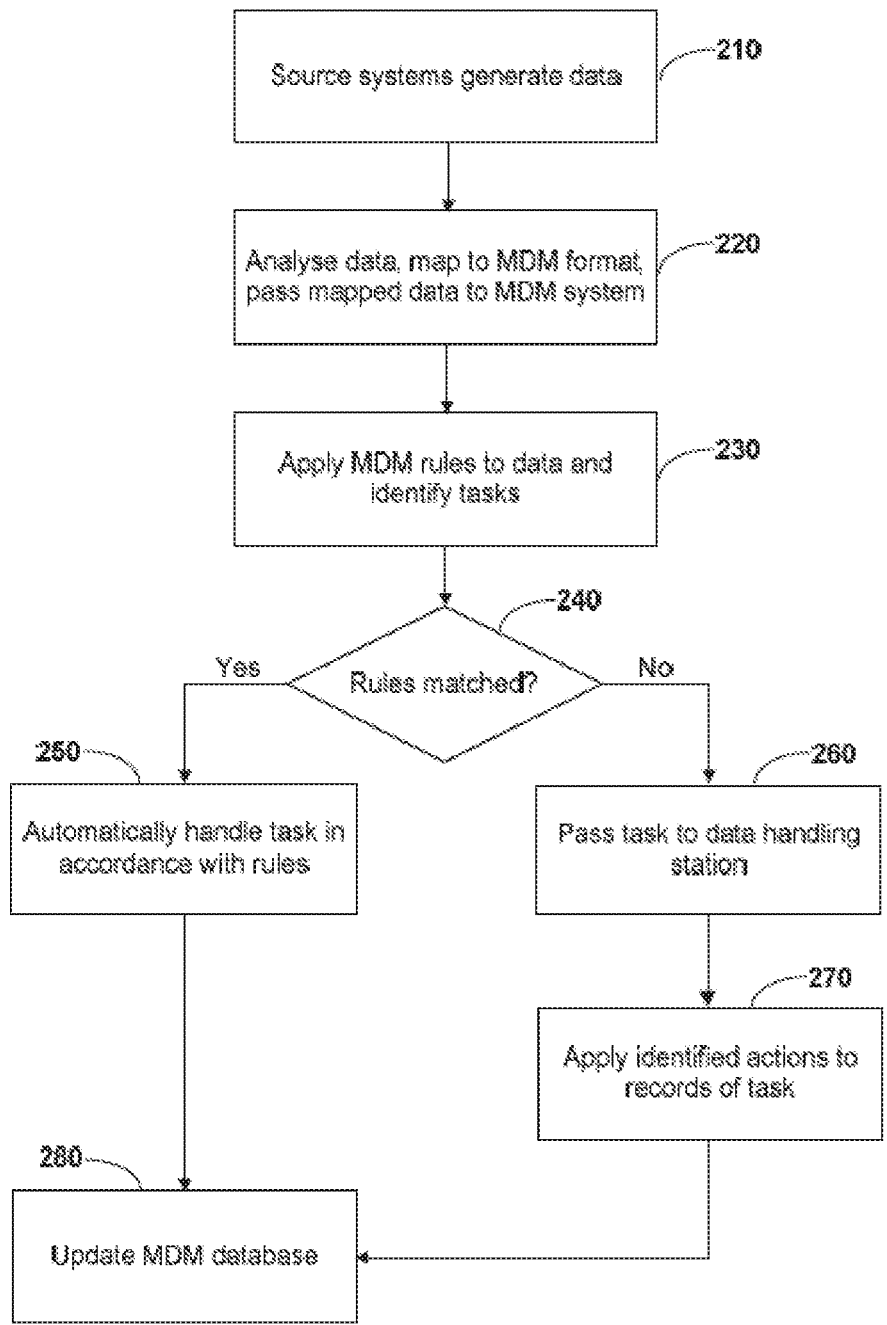
FIG. 2 is a flowchart illustrating operational steps for operating an MDM system, in accordance with an embodiment of the present invention.

FIG. 2 is a flowchart illustrating operational steps for operating MDM system 130, in accordance with an embodiment of the present invention. At step 210, source systems 1-3 110*a-c* generate data. At step 220, receiving component 120 analyses the generated data to identify data relevant to the organization's master data, and may map it to an MDM data format, such that MDM system 130 can handle the received data. At step 230, MDM system 130 applies applicable MDM rules in rules database 140 to the received data to identify a task appropriate to apply to the received data.

At decision 240, based on further rules MDM system 130 makes a determination as to whether or not a similarity criteria of an identified rule is met, such that MDM system 130 may automatically handle the task. If the answer is "yes" (i.e. a match), then at step 250, MDM system 130 automatically handles the task. Processing passes to step 280, where MDM system 130 updates the master data of MDM database 150 as determined by the applicable rules and the data.

If there is a partial match to an applicable rule, so that the rule is appropriate but the task does not completely meet the similarity criteria of the rule, then the answer is "no" (i.e., a partial match) and at step 260, MDM system 130 passes the task to active task list 160 of task handling station 170. A data steward at task handling station 170 determines and applies one or more actions the queued task at step 270. At step 280, MDM system 130 updates the master data of MDM database 150 as appropriate.

MDM system 130 as described above may identify features of data which give rise to a large number of recurring tasks which only partially meet the matching criteria of a rule of rules database 140 of MDM system 130. This may occur for example where a new format of a particular type of data record arises, or where a default value occurs in a data field so that a large number of data records have the same value in that data field. This results in a partial match to an established rule so that matching criteria for automatic processing by MDM system 130 are not met. This may affect a large number of data records with the result that there are a large number of very similar tasks in the queue for the attention of a data steward at task handling station 170. Data steward at task handling station 170 then has to issue a large number of identical actions to MDM system 130. The extra work involved for data steward at task handling station 170 and subsequent extra data processing may lead to a delay in processing of tasks which may delay updating of master data. Master data may not be up to date as a result and the quality of the organization's master data suffer thereby.

Figure 3A:
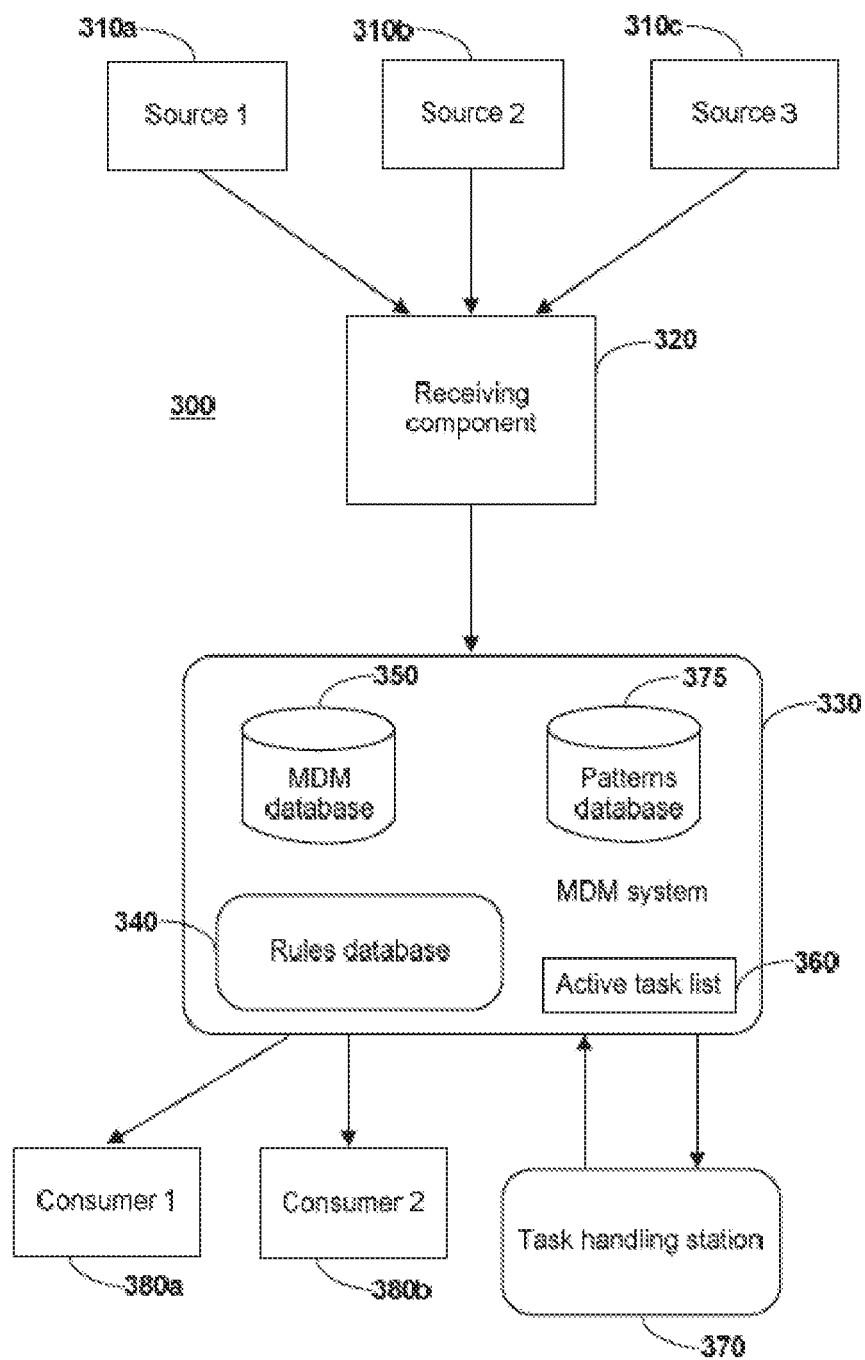
FIG. 3A is a block diagram illustrating an organizational data processing system, in accordance with an embodiment of the present invention.

FIG. 3A is a block diagram illustrating organizational data processing system 300, in accordance with an embodiment of the present invention. In FIG. 3A, organizational data processing system 300 is as an organizational data processing system as described in U.S. patent application Ser. No. 14/849,688, filed on Sep. 10, 2015, to Limburn et al, entitled "Task Handling in a Multisystem Environment" and commonly assigned with the present application.

Organizational data processing system 300 is similar to organizational data processing system 100 as depicted in FIG. 1. Source systems 1-3 310*a-c* are comparable to source systems 1-3 110*a-c* and continually generate new data. Similarly with reference to FIG. 1, FIG. 3A illustrates representative consumers of master data, consumer 1 380*a* and consumer 2 380*b,* and as previously discussed, each of consumers 1 380*a* and 2 380*b* may be one of source systems 1-3 310*a-c.*

Receiving component 320 has comparable functionality to receiving component 120. Receiving component 320 passes processed data to MDM system 330. MDM system 330 comprises rules database 340 comprising a collection of policies and rules as described with reference to rules database 140 described in FIG. 1. MDM system 330 also includes MDM database 350 of master data, of comparable functionality to MDM database 150, as previously described with reference to FIG. 1.

MDM system 330 compares received data with master data in MDM database 350 of MDM system 330, applies appropriate rules of rules database 340, and identifies a task which cannot be automatically processed but requires further action, as previously described with reference to FIG. 1.

As similarly described in FIG. 1, the further action comprises passing by task handling functionality of MDM system 330 the identified task to active task list 360 comprising a queue for action at task handling station 370 by a data steward. Although illustrated as a single task list, active task list 360 may comprise any number of individual queues over which the task list is distributed, for example one queue per task handling station 370 of a data steward. Task handling station 370 may comprise a single task handling station, or any number of separate task handling stations 370.

As similarly described in FIG. 1, a data steward at task handling station 370 determines an appropriate action for each queued task, and task handling station 370 passes the determined action for the task to MDM system 330 which applies it to the appropriate master data in MDM database 350.

MDM system 330 further comprises patterns database 375 and associated pattern identification logic. For each task completed by data steward at task handling station 370, pattern identification logic of MDM system 330 identifies a pattern of the completed task. The pattern is a data record which represents the characteristics of the task and the action taken by the data steward at task handling station 370. Pattern identification logic of MDM system 330 records the pattern in a defined pattern format in patterns database 375. Each task pattern may comprise characteristics identified as attributes of the task pattern.

Figure 3B:
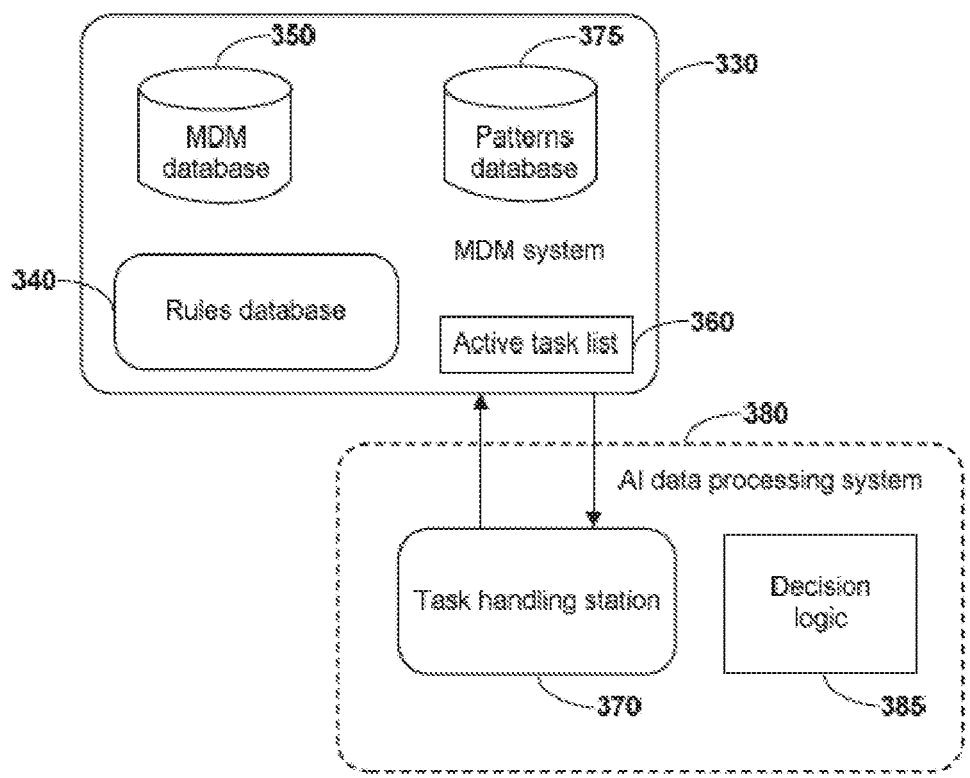
FIG. 3B is a block diagram illustrating a portion of an organizational data processing system, in accordance with an embodiment of the present invention.

FIG. 3B is a block diagram illustrating a portion of organizational data processing system 300. Task handling station 370 can be a part of artificial intelligence (AI) data processing system 380. AI data processing system 380 comprises decision logic 385 to support decision making of a data steward, or in some cases to replace the data steward. AI data processing system 380 may comprise data gathering functionality, a database, fuzzy logic processing, or other artificial intelligence constructs to augment or replace human decision making.

If AI data processing system 380 replaces human decision making, the action taken to complete a task in active task list 360 is determined by decision logic 385 and the action is performed automatically. The identified task pattern of the completed task is written to patterns database 375 as described with reference to FIG. 3A. Task handling station 370 may comprise a component part of AI data processing system 380, or of MDM system 330, and not comprise a physically separate location. AI data processing system 380 may comprise an integrated part of MDM system 330 and can be a part of data processing functionality of MDM system 330.

Figure 4A:
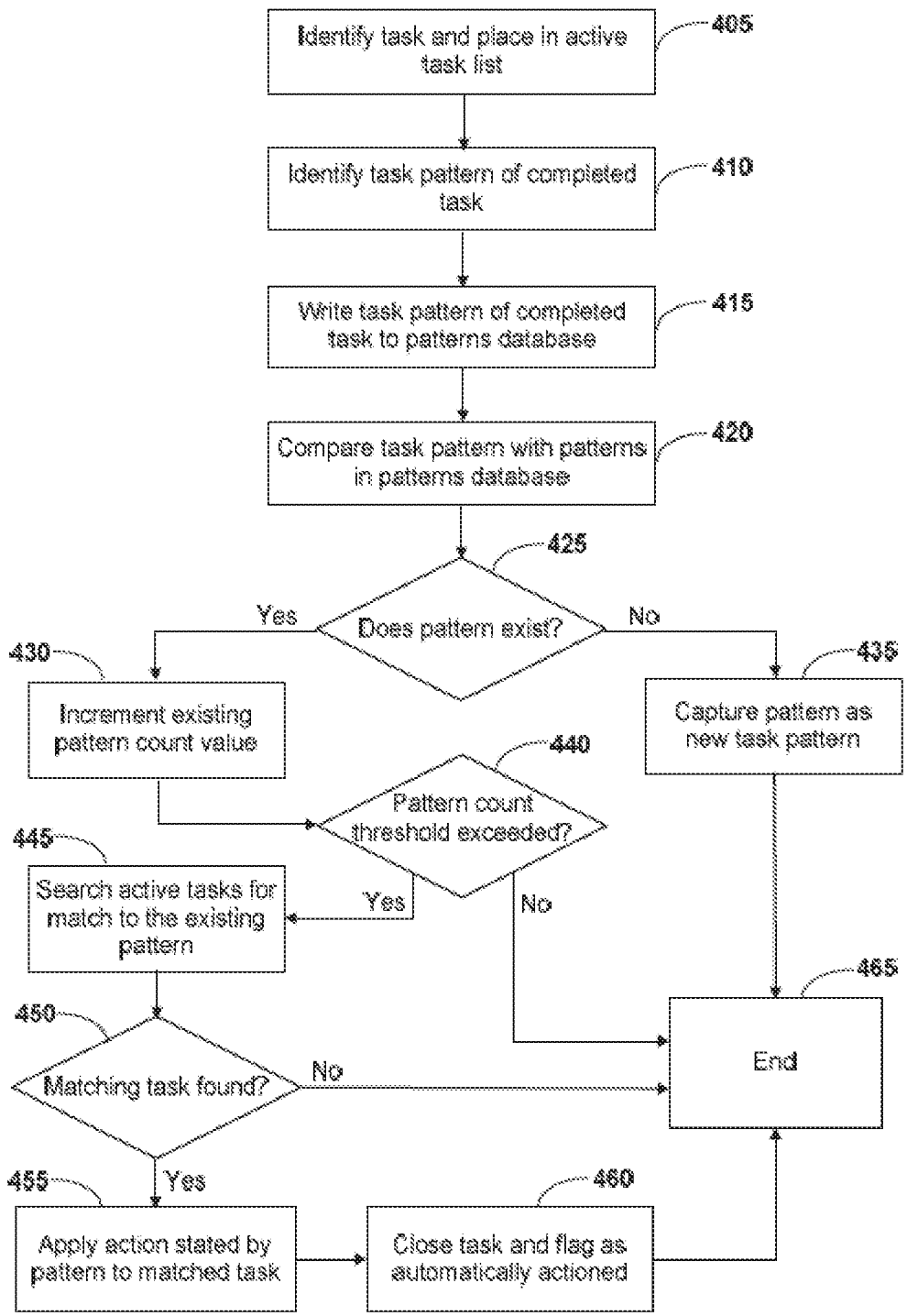
FIG. 4A is a flowchart illustrating typical operational steps for operating a MDM system as illustrated in FIGS. 3A and 3B.

FIG. 4A is a flowchart illustrating typical operational steps for operating MDM system 330 as illustrated in FIGS. 3A and 3B. The flowchart of FIG. 4A commences from step 260 as described with reference in FIG. 2, which is at the point where a task is passed by task handling functionality of MDM system 330 to a task handling station 370 of a data steward for action. MDM system 330 identifies a task for data steward action at step 405 and places it in active task list 360. Data steward at task handling station 370 removes the task from active task list 360 and completes the task. In the arrangement of FIG. 3B completion (i.e., removing the task from active task list 360 and completing the task) is assisted by or completed by AI data processing system 380.

At step 410 pattern identification logic of MDM system 330 identifies the task pattern of the completed task (e.g., associated with). In addition to the action taken by the data steward to complete the task, the task pattern identified may include such items as an identifier of the data items in the task, and the relevant fields matched. At step 415 pattern processing logic of MDM system 330 writes the identified task pattern in a defined task pattern format to patterns database 375. Pattern processing logic of MDM system 330 may group the task patterns in an appropriate logical order within patterns database 375.

Pattern identification logic of MDM system 330 repeats the task pattern identification operation for each task completed at task handling station 370. Processing moves to step 420 at which processing logic of MDM system 330 compares the identified task pattern with patterns in patterns database 375 in a matching operation. At decision 425 MDM system 330 processing logic determines if there is a match using appropriate similarity criteria. If it determines there is no match, in other words the pattern is not pre-existing in task patterns database 375, processing follows the "no" branch. At step 435 pattern processing logic of MDM system 330 captures the task pattern as a new task pattern and records it in patterns database 375 in the defined pattern format. Processing then passes to step 465 at which it ends.

If at decision 425 the pattern does exist in patterns database 375, then processing follows the "yes" branch, and pattern processing logic of MDM system 330 increments a pattern count value of the identified pattern by one at step 430. Processing moves to decision 440 at which pattern processing logic determines whether a pattern count threshold is exceeded for this pattern. The value of the pattern count threshold for the pattern may be set at a value determined to indicate the likelihood of a large amount of data processing time at task handling station 370 of a data steward. If the pattern count threshold is not exceeded, then processing follows the "no" branch to step 465 where processing ends.

If the pattern count threshold is exceeded for that pattern, processing follows the "yes" branch and at step 445, processing logic of MDM system 330 searches all active tasks in active task list 360 at task handling station 370 of a data steward. Processing then moves to decision 450 where processing logic of MDM system 330 determines if any task matching the pattern whose threshold is exceeded is present in a queue of active task list 360. If no matching task is found, then processing follows the "no" branch and processing ends at step 465.

If processing logic of MDM system 330 finds a matching task in the active tasks in active task list 360, processing follows the "yes" branch to step 455. At step 455, processing logic of MDM system 330 applies the action recorded for that task pattern in task pattern database 375 to that queued matching task. Processing passes to step 460 and processing logic closes the task and flags it in the queue as automatically actioned. The process ends at step 465.

Processing logic of MDM system 330 repeats this process for each further task present in active task list 360 which matches this task pattern. This task pattern now has status of "threshold value exceeded" and processing logic of MDM system 330 will automatically process any further tasks entering active task list 360 which match this pattern so that they are not presented at task handling station 370 to a data steward for action. In an alternative embodiment, processing logic of MDM system 330 prevents matched tasks from entering active task list 360. Processing logic continues to increment pattern counts of task patterns after they reach their threshold values.

The MDM system 330 as described with reference to FIGS. 3A, 3B, and 4A comprises a rules database 340 which MDM system 330 uses to identify tasks which may be processed automatically because they match a rule or rules of rules database 340. MDM system 330 further comprises a patterns database 375. MDM system 330 uses this to identify tasks partially matched to rules and which have task patterns matching patterns of patterns database 375 with a pattern count exceeding a threshold value. These tasks are also processed automatically by MDM system 330. The result is a lowering of the number of tasks which require further processing, including action at a task handling station 370 of a data steward.

As operation of MDM system 330 continues, new task patterns continually enter patterns database 375. MDM system 330 also continually identifies task patterns in patterns database 375 which exceed their pattern count threshold values and are flagged as "threshold value exceeded" status in patterns database 375. In this way patterns database 375 grows in size over time, and numbers of task patterns automatically actioned also increases over time. In some arrangements, a data governance council may use contents of task patterns database 375 to provide information when considering changes to policies and rules of rules database 340.

A data quality issue may arise with the operation of the system of U.S. patent application Ser. No. 14/849,688 described above with reference to FIGS. 3A, 3B, and 4A. It may occur that a data steward enters an incorrect or inappropriate completion action for a task. The following example illustrates the consequences of this. In the example, a data steward at task handling station 370 determines a completion action for a task, the completion action being incorrect, and completes the task at step 405. At step 410 pattern identification logic of MDM system 330 identifies the task pattern of the completed task. At step 415 pattern processing logic of MDM system 330 writes the identified task pattern to patterns database 375. At step 420, processing logic of MDM system 330 compares the identified task pattern with patterns in patterns database 375 in a matching operation, and at decision 425 MDM system 330 processing logic determines there is no match and captures the pattern as a new task pattern in task patterns database 375 at step 435. Patterns database 375 now contains an incorrect task pattern.

The same data steward at task handling station 370 now handles another task identical to the first, and assigns the same incorrect completion action for the task. This time processing logic of MDM system 330 compares the identified task pattern with patterns in patterns database 375 at step 420, identifies that the task pattern exists at decision 425, and increments the existing pattern count value at step 430. The process repeats with further identical tasks until the pattern count threshold is exceeded at decision 440. Now at step 445, processing logic of MDM system 330 searches all active tasks in active task list 360 at task handling station 370 of a data steward and applies the action of the incorrect task pattern to all matched tasks, decision 450 and step 455.

Processing passes to step 460 and processing logic closes all matched tasks and flags them as automatically actioned.

The issue illustrated with reference to this example may have an undesirable effect on the integrity of the master data of MDM database 350 of MDM system 330. Embodiments of the present invention provide a mechanism to facilitate the resolution of the above-mentioned data quality issue.

Figure 4B:
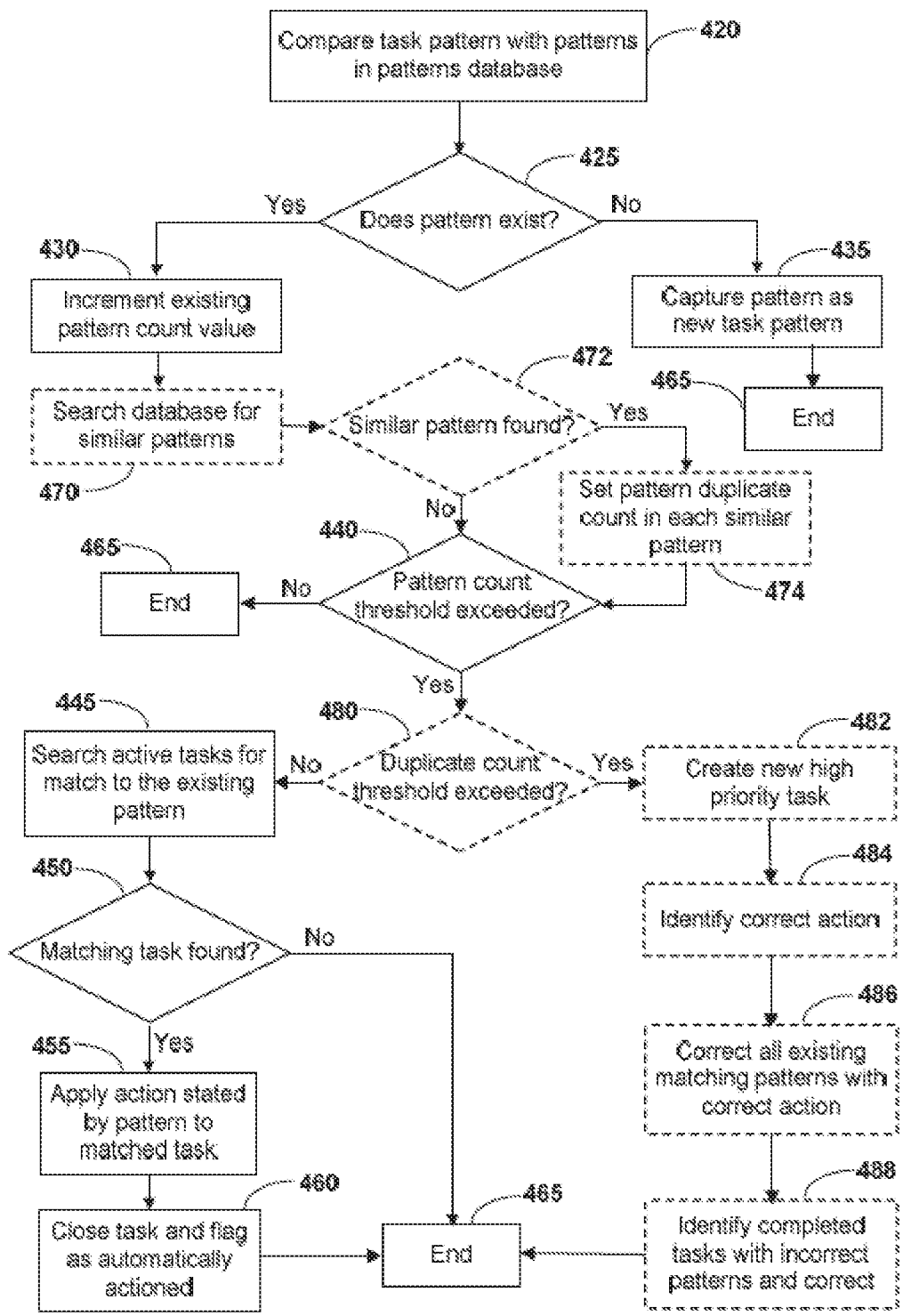
FIG. 4B is a flowchart illustrating operational steps for operating an MDM system as illustrated in FIGS. 3A and 3B, in accordance with an embodiment of the present invention.

FIG. 4B is a flowchart illustrating operational steps for operating MDM system 330 as illustrated in FIGS. 3A and 3B, in accordance with an embodiment of the present invention. In this embodiment, the flowchart in FIG. 4B includes a portion of the flowchart in FIG. 4A, starting from step 420 and including additional operational steps, in accordance with an embodiment of the present invention. For illustrative purposes, additional operational steps that are implemented in accordance with an embodiment of the present invention are illustrated with a dashed border.

In this embodiment, at step 420, processing logic of MDM system 330 compares the identified task pattern with task patterns in patterns database 375. At decision 425, MDM system 330 processing logic determines if there is a match using appropriate similarity criteria. If it is determined that there is no match, processing follows the "no" branch. At step 435, pattern processing logic of MDM system 330 captures the task pattern as a new task pattern and records it in patterns database 375 in the defined pattern format. Processing then passes to step 465 at which it ends.

If, at decision 425, the pattern does exist in patterns database 375, then processing follows the "yes" branch, and pattern processing logic of MDM system 330 increments a pattern count value of the identified pattern at step 430 (e.g., incrementing by 1). In this embodiment, processing passes to step 470, at which processing logic of MDM system 330 compares the identified task pattern with other task patterns in task patterns database 375. Processing logic searches patterns database 375 to identify similar task patterns at step 470, and identifies if similar patterns exist at decision 472. Similar patterns are partially matching task patterns. Any suitable comparison logic as understood by a person skilled in the art may be used, and any suitable criterion or measure of similarity may be used to identify a partially matching task pattern as a similar pattern. In one embodiment, similar patterns are those which are identical apart from the action taken to complete the task.

If processing logic finds no similar patterns, then the "no" branch is followed and processing moves to decision 440. If a similar pattern is found, then processing follows the "yes" branch to step 474. At step 474, processing logic applies an additional attribute to the identified task pattern and to each pattern identified as a similar pattern. The additional attribute comprises a pattern duplicate count. The pattern duplicate count may comprise, for example, the number of patterns identified as similar to each other, so if one further similar pattern is found, the duplicate count may be set at, or specified to be, two. As used herein, therefore, duplicate task patterns are those which match as similar according to the criterion or measure of similarity used. When it identifies a new duplicate pattern, processing logic increments the pattern duplicate count for each pattern identified as a duplicate. For example, if a new pattern identifies two further duplicate patterns, it increments the pattern duplicate count for each by one to three, and adds the pattern duplicate count of three to the new pattern. Processing proceeds to decision 440.

At decision 440, pattern processing logic determines whether the pattern count exceeds a pattern count threshold for this pattern. The value of the pattern count threshold for the pattern may be set as described previously in relation to FIG. 4A. If the pattern count does not exceed the threshold, then processing follows the "no" branch to step 465, where processing ends. If the pattern count exceeds the pattern count threshold for the pattern, processing follows the "yes" branch to decision 480. At decision 480, processing logic determines if the pattern duplicate count threshold is exceeded. In an embodiment, the pattern duplicate count threshold is a system wide threshold set, for example, by a system administrator.

If, at decision 480, the pattern duplicate count does not exceed the pattern duplicate count threshold, processing follows the "no" branch and passes to step 445. At step 445, processing proceeds as described previously with reference to FIG. 4A, and will not be described further. If the pattern duplicate count at decision 480 exceeds the pattern duplicate count threshold, processing follows the "yes" branch to step 482.

At step 482, processing logic creates a new high priority task. It may place this task, by virtue of the high priority, at the head of active task list 360 of MDM system 330. The high priority task comprises a list of the patterns identified as similar to each other. A data steward at a task handling station 370 takes the high priority task from a queue of active task list 360 and determines the correct completion action for the identified patterns. Processing logic of MDM system 330 identifies the correct completion action at step 484. In embodiments, the data steward handling the high priority task comprises a "power user" having additional privileges allowing the correction of completed actions. In some embodiments, the power user data steward handles only high priority tasks and the active task list 360 comprises a list of high priority tasks separate from active task lists for other tasks.

Processing logic of MDM system 330 corrects all existing matching patterns with the correct task completion action at step 486, and merges the patterns as a single corrected task pattern. MDM system 330 processing logic identifies at step 488 all previously completed tasks matching each pattern which was a subject of the high priority task, for example using pattern identifiers, in a listing of completed tasks. Processing logic determines completed tasks with patterns having incorrect completion actions and corrects the completion actions. It updates MDM database 350 with corrected data as the completion actions are corrected.

Figure 5:
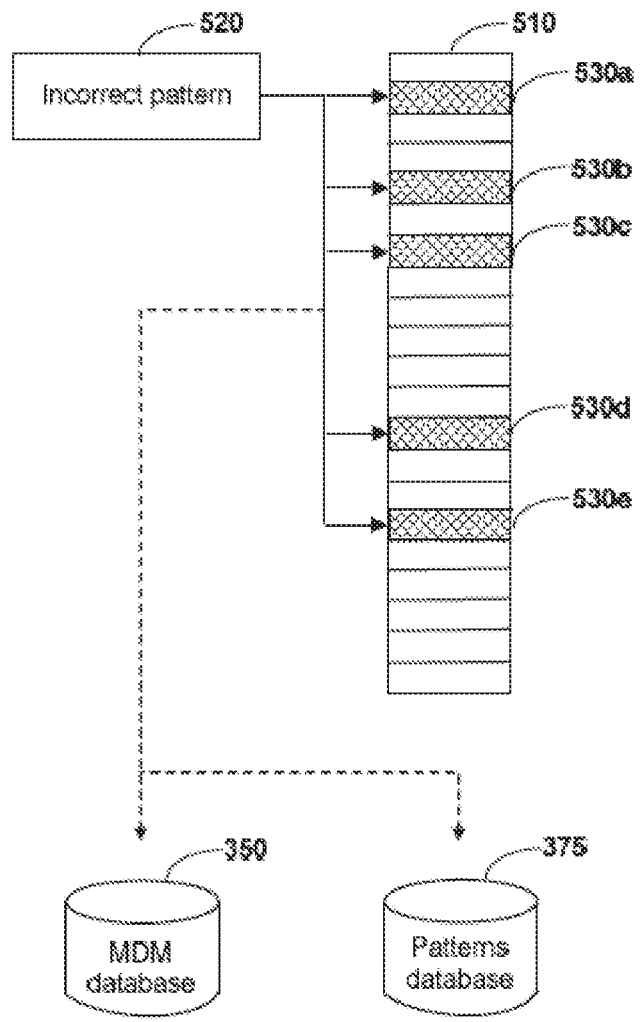
FIG. 5 is a block diagram illustrating additional detail of an operational step described in FIG. 4B, in accordance with an embodiment of the present invention.

FIG. 5 is a block diagram illustrating additional detail of operational step 482 described in FIG. 4B, in accordance with an embodiment of the present invention. After processing logic creates a new high priority task at step 482, a power user data steward, for example, determines the correct action for identified duplicate patterns. MDM system 330 identifies this at step 484. In an example, processing logic identifies pattern1 and pattern2 as duplicates. The power user data steward determines that pattern1 comprises the correct completion action for the tasks represented by the duplicate patterns, and so pattern2 comprises an incorrect completion action. The system must therefore correct tasks completed using pattern2.

MDM system 330 records completed tasks, for example in log 510. A person of ordinary skill in the art will understand that other methods for recording details of completed tasks may be used without departing from the scope of the invention. Processing logic of MDM system 330 matches incorrect pattern 520, in the current example case pattern2, against log 510 and identifies matched tasks 530*a* to 530*e* which were completed with this incorrect pattern. Processing logic identifies completed tasks 530*a* to 530*e* in MDM database 350. Processing logic corrects incorrectly completed tasks 530*a* to 530*e* in MDM database 350, and corrects the completed task records to the correct pattern, in this case pattern1. Processing logic removes the incorrect pattern, in this case pattern2, from patterns database 375, ensuring future matches will be to the correct pattern, pattern1.

FIG. 6 illustrates active task list 600 including a task queue, in accordance with an embodiment of the present invention. Active task list 600 comprises tasks 610*a* to 610*x*. Each task 610*a-x* comprises a data record structure. Tasks 610*a* to 610*d* comprise tasks having structure as described in U.S. patent application Ser. No. 14/849,688.

Taking task 610*a* as an example, each task comprises the following. Task id 615 comprises a unique identifier applied by MDM system 330 to the task in the queue. Task type 620 comprises a task type identifier according to task classification processing logic of MDM system 330. Data covered by the task 625 comprises for example the data records identified as possibly associated by a rule of rules database 340. Source ID 630 comprises one of source systems 1-3 310*a-c*, as described above with reference to FIG. 3A. Linked attributes 635 comprises the elements identified in records A and B which are matched by MDM system 330 processing logic. Action taken 640 comprises the action taken by MDM system 330 to process task 610*a* and as entered by a data steward. Processing of active task list 600 proceeds in task order 610*a*, 610*b*, 610*c*, 610*d*, as described in U.S. patent application Ser. No. 14/849,688.

Task 610*x* is a high priority task according to an embodiment of the present invention and processing logic generates it as described above with reference to FIG. 4B. MDM system 330 creates task 610*x* when a pattern duplicate count threshold is exceeded. Task id 615*a* comprises a unique identifier applied by MDM system 330 to the task. Task type 620*a* identifies a duplicate pattern resolution task. In the example illustrated this task type is termed PatternCount-ThresholdAlert. In embodiments, MDM system 330 identifies this task type as requiring the system to prioritize task 610*x* by putting it to the head of an active task list 600. In an embodiment, MDM system 330 places task 610*x* in an active task list 600 of a power user having additional access privileges which allow the correction of completed actions.

High priority task 610*x* comprises the completion actions of each of the identified duplicate patterns. In this case, task 610*x* comprises two identified duplicate patterns having completion actions 625*a* and 625*b*. When a data steward for example a power user determines a correct action for the duplicate patterns, MDM system 330 processing logic enters the action taken 640*a* in task 610*x*. Processing logic follows the process described above with reference to FIGS. 4B and 5 to complete correction of task patterns in task pattern database 375 and master data records in MDM database 350.

Figure 7:
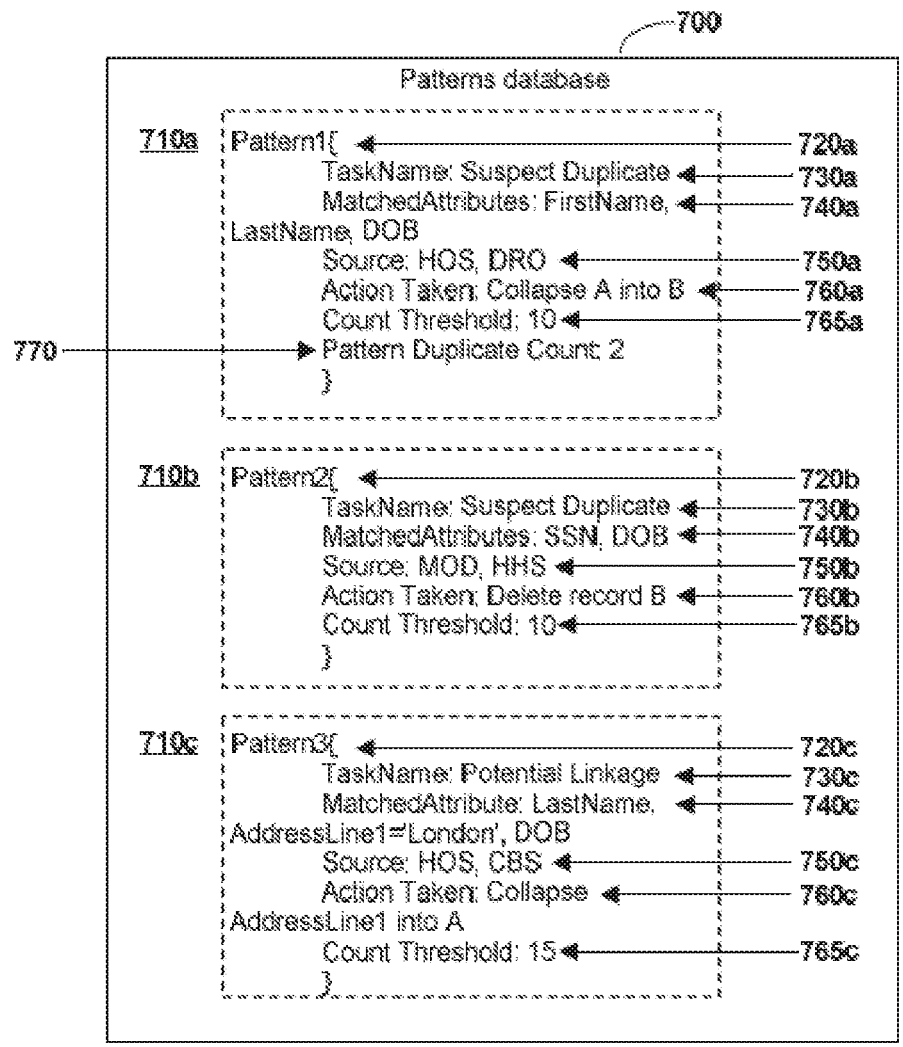
FIG. 7 is a block diagram illustrating a patterns database including patterns, in accordance with an embodiment of the present invention.

FIG. 7 is a block diagram illustrating patterns database 700 that includes patterns, in accordance with an embodiment of the present invention. Patterns database 700 may be similar to patterns database 375, as described with regard to FIG. 3A. Illustrated in FIG. 3A are task patterns 710*a-c* as they might appear in patterns database 700. Three task patterns 710*a*, 710*b* and 710*c* show example task patterns. Each task pattern 710*a-c* comprises metadata identifying the content of the respective task pattern 710*a-c* and an action which was taken to handle the task originating from the respective task pattern 710*a-c*. Each task pattern 710*a-c* may also comprise data from constituent records of the originating task. It will be apparent that any combination of data and metadata may be envisaged without departing from the scope of the invention, for example exclusively metadata, exclusively data or some mixture of the two.

In the illustrated examples, task patterns 710*a*, 710*b* and 710*c* comprise task pattern names, respectively Pattern1 720*a*, Pattern2 720*b* and Pattern3 720*c*. Further fields of the task patterns comprise for example the type of task, here identified as 'TaskName', 730*a*, 730*b* and 730*c* respectively. This field comprises metadata describing the task type, for example Suspect Duplicate in 710*a*. Field 740*a*, 740*b* and 740*c* comprise the attributes matched in the task, here identified as 'MatchedAttribute'. This field may comprise data in addition to metadata, as shown in task pattern 710*c*, field 740*c* which contains data in the form of AddressLine1='London'. Field 750*a*, 750*b* and 750*c* comprises the source from which the data for the task was taken, here identified as 'Source'.

Field 760*a*, 760*b* and 760*c* comprises the action taken for the originating task, identified as Action Taken. Field 765*a*, 765*b* and 765*c* comprises the pattern count threshold for respectively task patterns 710*a*, 710*b* and 710*c*. In the illustrated example, Pattern1 720*a* comprises additional field comprising pattern duplicate count 770 according to an embodiment of the present invention. Processing logic sets this attribute as described with reference to FIG. 4B, step 474. Processing logic creates a high priority task, for example task 610*x*, when the value of pattern duplicate count 770 exceeds the pattern duplicate count threshold, for example a system wide pattern duplicate count threshold.

Figure 8A:
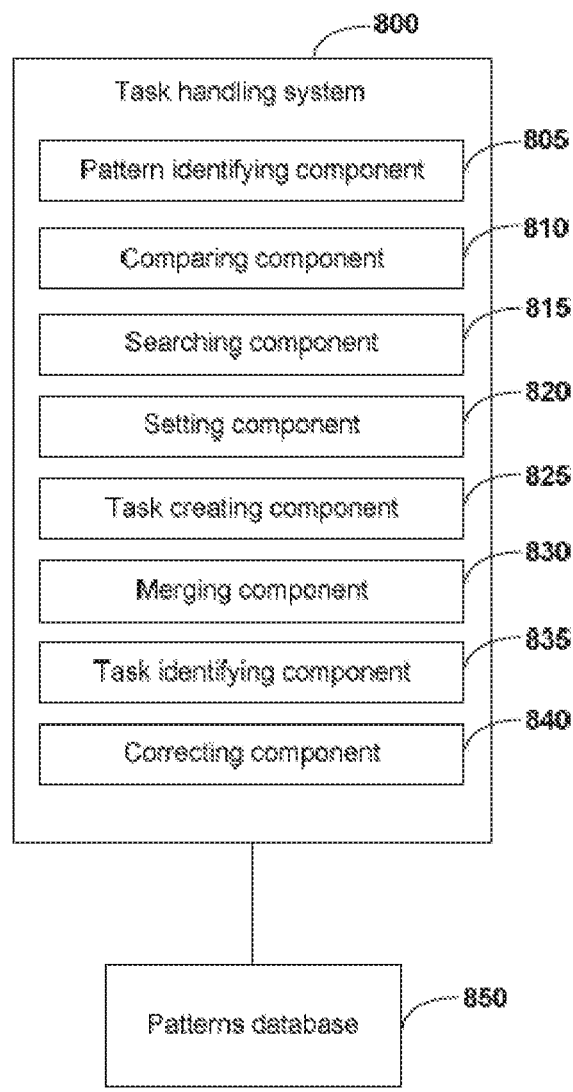
FIG. 8A is a block diagram illustrating a task handling system, in accordance with an embodiment of the present invention.

FIG. 8A is a block diagram illustrating task handling system 800, in accordance with an embodiment of the present invention. Task handling system 800 may comprise a part of an MDM system according to embodiments of the invention, such as MDM system 330 described above with reference to FIGS. 3A and 3B. In task handling system 800, pattern identifying component 805 identifies a task pattern in a task completed at a task handling station, such as task handling station 370. The system writes the identified task pattern to patterns database 850, similar to that of patterns database 375 described above with reference to FIGS. 3A and 3B.

Comparing component 810 compares the identified task pattern with existing task patterns of patterns database 850. If the identified task pattern matches an existing task pattern in patterns database 850, incrementing component 815 increments a task pattern count of the existing task pattern by one. If the identified task pattern matches an existing task pattern in task patterns database 850, searching component 815 searches task patterns database 850 for similar task patterns which are partial matches. In embodiments, similar task patterns are those which are identical except for the completion action taken. If a similar task pattern is identified, a setting component sets a pattern duplicate count attribute in each of the task patterns identified as being similar to each other.

If a patterns duplicate count threshold is exceeded, task creating component 825 creates a new task which comprises information on the completion actions for each of the task patterns identified as being similar to each other. The system may present this task to a data steward, for example a power user. The data steward determines the correct completion action and the MDM system identifies this. In some embodiments, decision logic of an artificial intelligence system determines the correct completion action. Decision logic may be, for example, decision logic 385 of artificial intelligence data processing system 380 illustrated in FIG. 3A.

Merging component 830 merges the first identified task pattern and each of the identified similar patterns into a correct task pattern. Task identifying component 835 identifies tasks completed using incorrect completion actions. It does this by, for example, searching a log comprising entries identifying completed tasks, for example log 510 as illustrated in FIG. 5. Correcting component 840 corrects the completion actions for the tasks comprising the identified incorrect completion actions.

Figure 8B:
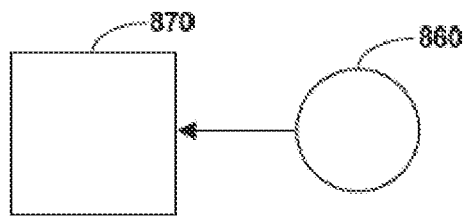
FIG. 8B is a block diagram illustrating a computer program product, in accordance with an embodiment of the present invention.

FIG. 8B is a block diagram illustrating a computer program product, in accordance with an embodiment of the present invention. The computer program product comprises a computer readable storage medium 860. Computer readable storage medium 860 comprises a computer program stored therein which implements embodiments of the invention as described above when loaded in to a data processing device, for example data processing apparatus 870 illustrated, and executed by data processing apparatus 870.

Figure 9:
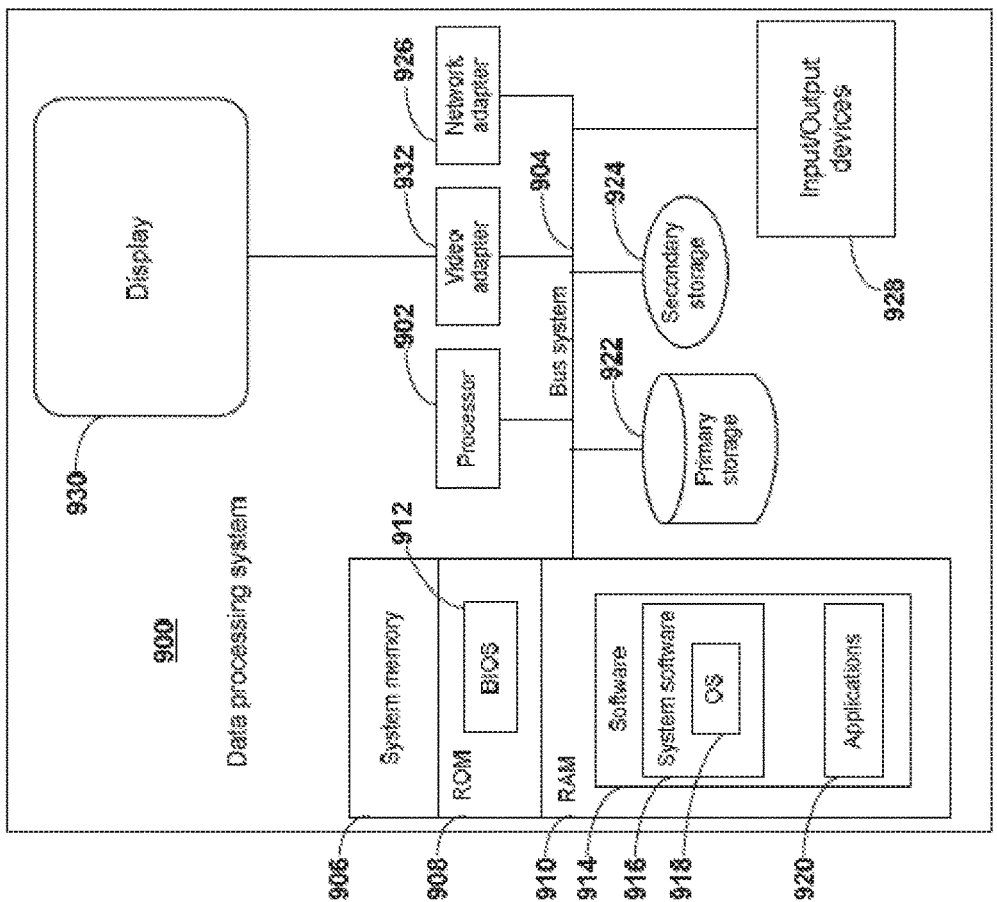
FIG. 9 is a block diagram illustrating a data processing system, in accordance with an embodiment of the present invention.

FIG. 9 is a block diagram illustrating data processing system 900, in accordance with an embodiment of the present invention. Data processing system 900 operable for storing and/or executing program code includes at least one processor 902 coupled directly or indirectly to memory elements through a system bus 904. The memory elements may comprise local memory employed during actual execution of the program code, bulk storage memory, and cache memory for providing temporary storage of at least some program code in order to reduce the number of times program code must be retrieved from bulk storage during program execution.

Memory elements may comprise system memory 906 in the form of non-volatile read only memory (ROM) 908 and volatile random access memory (RAM) 910. A basic input/output system (BIOS) 912 may be stored in ROM 908. Software 914 may be stored in RAM 910. Software 914 may comprise system software 916, which may comprise operating system software 918, and software applications 920.

Memory elements may also comprise primary storage means 922 which may comprise a magnetic hard disc drive, and secondary storage means 924 which may comprise an optical disc drive or a magnetic disc drive. The primary and secondary storage means and their associated computer-readable storage media provide non-volatile storage of computer-executable instructions, data structures, program modules and other data for data processing system 900. Software applications may be stored on the primary and secondary storage means 922, 924 as well as in system memory 906.

Data processing system 900 may operate in a networked environment using logical connections to one or more remote data processing systems via network adapter 926.

Input/output (I/O) devices 928 may be coupled to the system either directly or through intervening I/O controllers. A user may enter commands and information into system 900 through input devices such as a keyboard, pointing device such as a mouse, or other input devices such as microphone, joystick, trackball, touchpad, game controller, satellite dish, scanner etc. Output devices may comprise printers, speakers etc. Display device 930 may also be connected to system bus 904 via an interface such as video adapter 932.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

What is claimed is:

1. A method comprising:
    identifying, by one or more computer processors, a task pattern associated with a task completed, in a task handling system, wherein the identified task pattern includes:
        at least one of task data and task metadata; and
        an action taken in the task handling system to complete a task;
    writing the identified task pattern in a defined task pattern format to a task patterns database, wherein the task patterns in the task patterns database are grouped in a logical order
    responsive to determining that the identified task pattern matches an existing task pattern in the task patterns database:
        incrementing, by the one or more computer processors, a pattern count value of the matching existing task pattern;
        searching, by the one or more computer processors, the task patterns database for task patterns that are similar to the matching existing task pattern;
        responsive to determining that one or more similar task patterns are identified, specifying, by the one or more computer processors, for each of the one or more similar task patterns, a duplicate pattern count that is based on the number of identified similar task patterns;
        responsive to determining that the duplicate pattern count for any one of the one or more similar task patterns exceeds a specified threshold, creating, by the one or more computer processors, a new task comprising data on completion actions for the matching existing task pattern and each of the one or more similar task patterns, wherein the new task is labeled to be identified as a high priority task and is assigned to the head of an active task list of the system;
        responsive to determining that the duplicate pattern count for any one of the one or more similar tasks patterns does not exceed a specified threshold, identify active tasks assigned to the matching existing task pattern in the task patterns databases, wherein the identified active tasks are applied to the identified task pattern, wherein the identified task pattern is closed and flagged as automatically actioned in the database after the identified active tasks are applied;
        writing both the pattern count value and the duplicate pattern count for the identified task pattern in the database; and
        processing automatically any tasks that have the duplicate pattern count exceeding the specified threshold before being presented to a data handling station or a data handling user, wherein the tasks that have the duplicate pattern count exceeding the specified threshold are configured to be prevented from entering the active task list of the system.

2. The method of claim 1, wherein the task handling system is a master data management system.

3. The method of claim 1, wherein the one or more identified similar task patterns are task patterns which are identical except for the completion actions.

4. The method of claim 1, wherein the specified threshold is a value of one.

5. The method of claim 1, further comprising:
    responsive to determining a correct completion action for the identified existing and similar task patterns, merging, by the one or more computer processors, the matching existing task patterns and the identified one or more similar task patterns in a correct task pattern including the correct completion action;

identifying, by the one or more computer processors, tasks associated with the identified task patterns previously completed using incorrect completion actions; and implementing, by the one or more computer processors, a corrective action for the identified tasks.

6. The method of claim 5, wherein the correct completion action is determined at a task handling station of the task handling system.

7. The method of claim 5, wherein the correct completion action is determined by decision logic of an artificial intelligence data processing engine.

* * * * *